United States Patent [19]
Pfisterer

[11] Patent Number: 6,098,387
[45] Date of Patent: Aug. 8, 2000

[54] GROUND CLEARING APPARATUS

[76] Inventor: James W. Pfisterer, 205 Country Day Rd., Chester, Md. 21619

[21] Appl. No.: 09/247,094

[22] Filed: Feb. 9, 1999

[51] Int. Cl.[7] .................................................. A01D 61/00
[52] U.S. Cl. ................... 56/16.4; 56/16.4 A; 56/16.4 B; 56/16.4 D
[58] Field of Search ...................... 56/16.7 R, 16.4 A, 56/16.9 B, 16.4 C, 16.4 D, 501, 130, 16.9, 9, 294, DIG. 12; 47/9; 241/46.08, 189.1, 194, 154, 605, 101.76, 101.7, 3, 5, 18, 83, 195, 92, 27

[56] References Cited

U.S. PATENT DOCUMENTS

| | | | |
|---|---|---|---|
| 2,809,389 | 10/1957 | Collins et al. | 56/501 |
| 3,284,831 | 11/1966 | Larsen | 15/82 |
| 3,815,178 | 6/1974 | Goldman | 19/205 |
| 4,379,385 | 4/1983 | Reinhall | 56/16.6 |
| 4,597,252 | 7/1986 | Williames | 56/130 |
| 4,854,507 | 8/1989 | Smith | 241/27 |
| 5,033,683 | 7/1991 | Taylor | 241/101 A |
| 5,358,189 | 10/1994 | Vandermone | 241/92 |
| 5,375,399 | 12/1994 | Kraft | 56/16.7 |
| 5,634,325 | 6/1997 | Thorman et al. | 56/7 |
| 5,661,962 | 9/1997 | Monaco | 56/16.9 |
| 5,778,646 | 7/1998 | Pfisterer | 56/16.4 |
| 5,870,888 | 2/1999 | Pugh | 56/16.7 |
| 5,983,560 | 11/1999 | Hartmeister | 47/9 |

*Primary Examiner*—Robert E. Pezzuto
*Assistant Examiner*—Arpad Fabian Kovacs
*Attorney, Agent, or Firm*—Dennison, Scheiner, Schultz & Wakeman

[57] ABSTRACT

A ground clearing machine including a mobile frame supporting a perforated drum positioned to receive debris upon forward movement of the frame. An internal driven shaft pivotally mounts flails and flexible blades alternating with the flails. The combined action of the flails and blades pulverizes the debris for rearward discharge through the drum perforations.

19 Claims, 4 Drawing Sheets

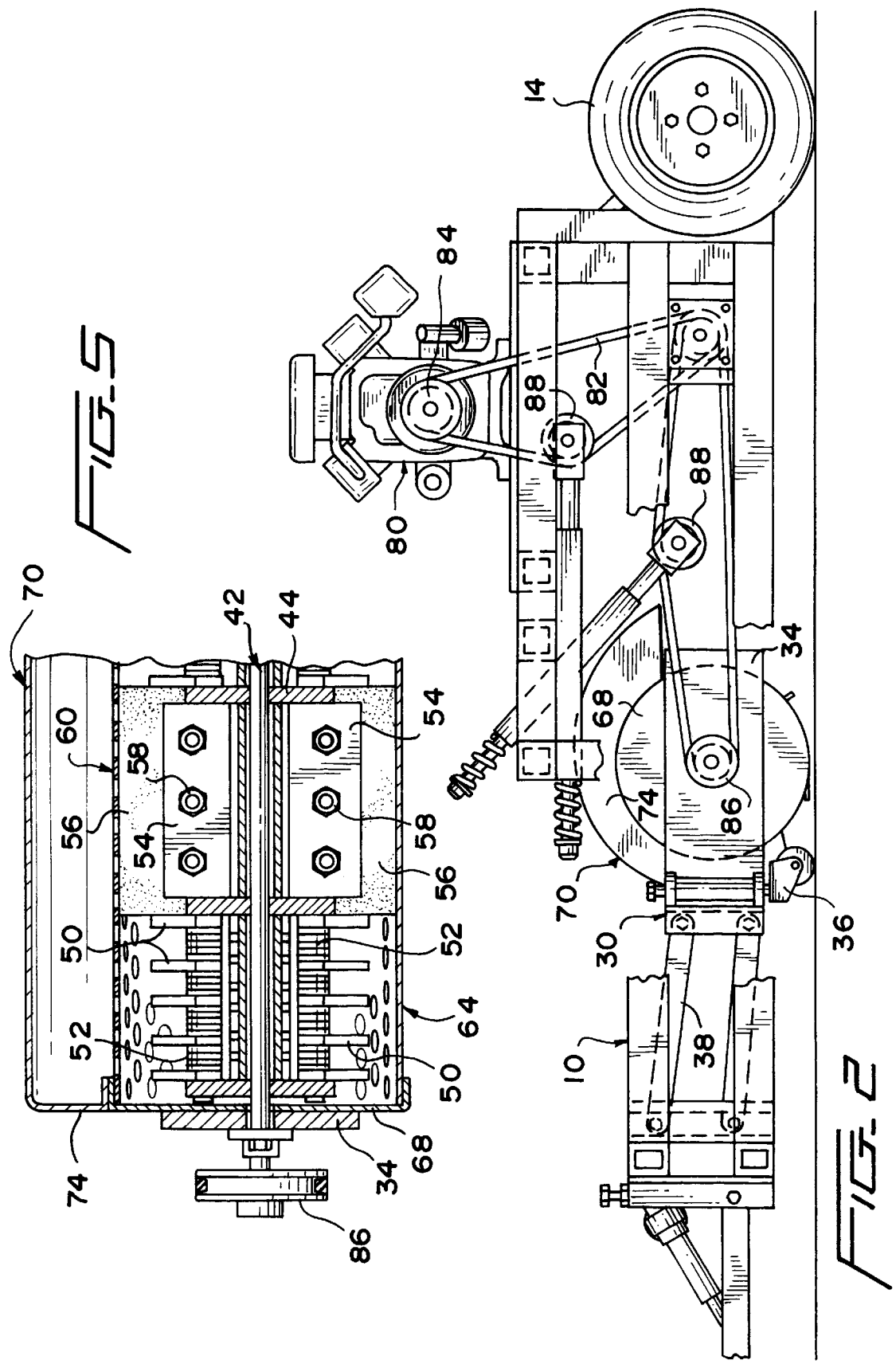

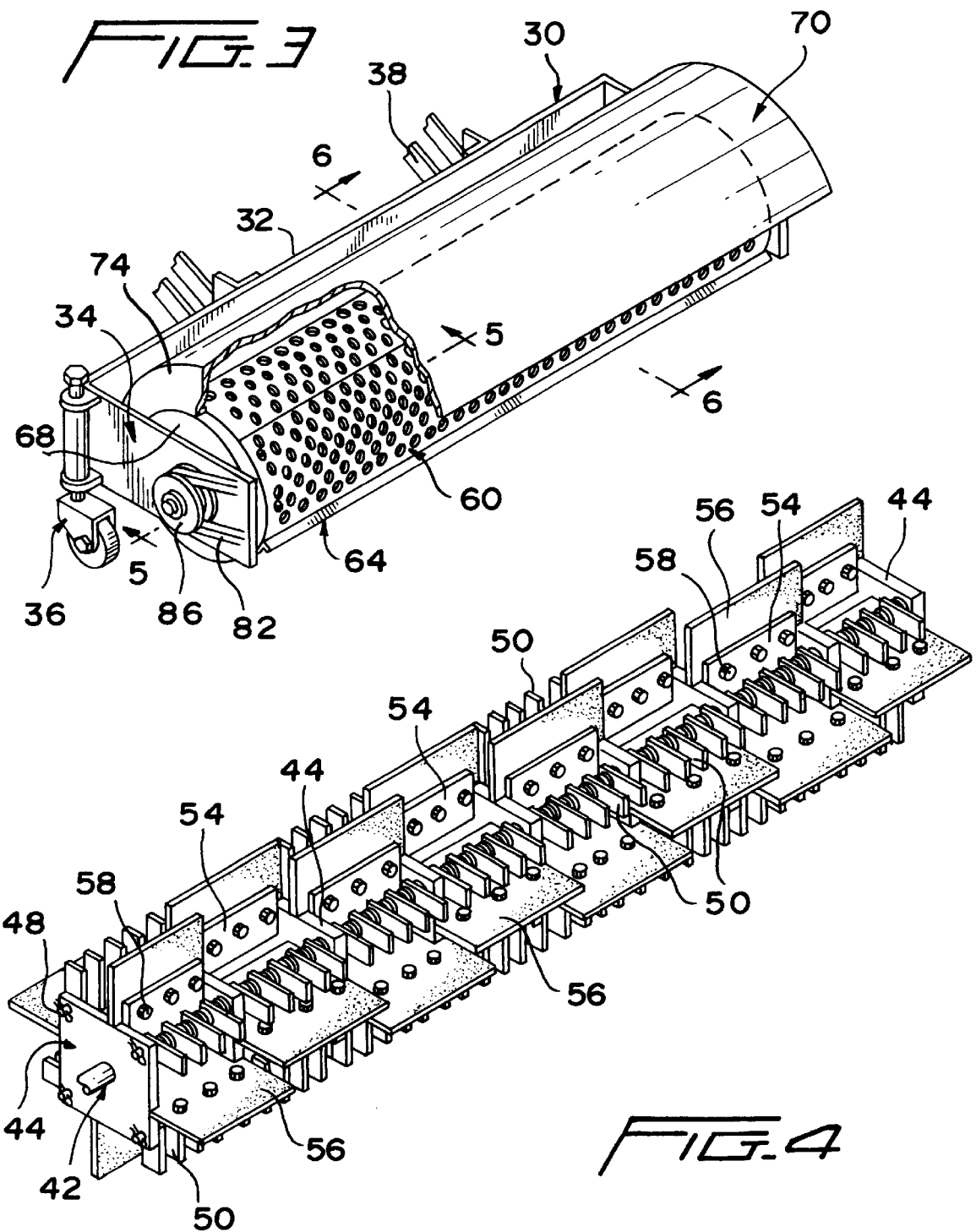

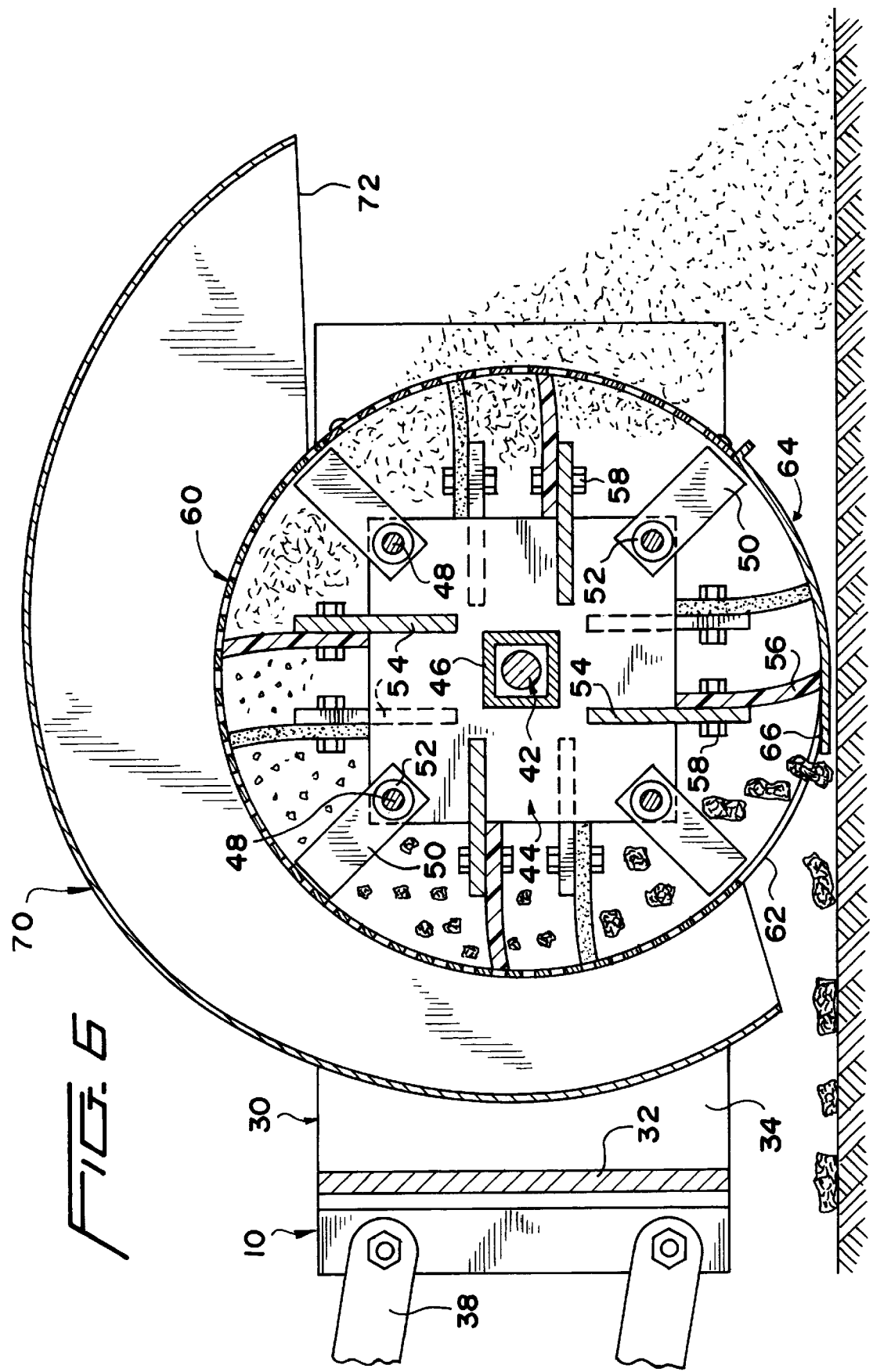

GROUND CLEARING APPARATUS

BACKGROUND OF THE INVENTION

The invention is generally intended for use in the grooming of golf courses, particularly the greens thereof.

Applicant's prior U.S. Pat. No. 5,778,646 sets forth the procedures involved in the complete grooming process, and is specifically concerned with the final grooming step.

The apparatus of the present invention, to the contrary, involves an intermediate step. More particularly, as an initial step in grooming a green, an aerator is used to form multiple fertilizer-accommodating holes in the green, approximately ⅝ inches in diameter and four inches apart. The holes are formed by the removal of plugs of material. These plugs, along with any thatch which might have accumulated on the green, must be removed prior to the final grooming step.

While flail type machines have been used for this purpose, they have not been very effective for a breaking up and redistributing of the plugs and thatch, particularly under wet or damp conditions. It is also has been proposed to use drag mats or blowers, both of which have also proved to be generally ineffective in properly removing the debris. Further, such procedures, at best, merely accumulate the debris to the side of the green or in the rough whereat the material is frequently left to slowly decompose, or must be manually removed.

SUMMARY OF THE INVENTION

The present invention is directed to apparatus for clearing the green of the cut plugs, thatch, thatch balls, and the like with this material being effectively pulverized and redistributed back on the green surface in the form of a fine powder or dusting which not only prepares the surface for further grooming steps, but also retains and redistributes fertilizer and other nutrients which will have accumulated within pulverized materials.

The apparatus or equipment of the invention utilizes a unique combination of flails and fan blades which create an air flow system which draws the plugs, leaves and thatch into the surrounding perforated drum wherein the material is effectively pulverized by the action of the flails and the fan blades. The blades are so positioned as to wipe against the interior surface of the drum to assist in the discharge of the material therethrough as a further pulverizing effect. This discharge of material is enhanced by the movement of the air with the blade and air movement also effectively continuously cleaning and clearing the drum perforations. This is particularly significant when moisture is present in the materials.

The ground clearing assembly will preferably be mounted on a floating frame positioned within a larger mobile frame including a power source for driving the flail and fan unit, and means for attachment to an appropriate pulling vehicle such as a tractor.

Other functions, features and details of the invention will become apparent from the more specific description of the invention following hereinafter.

BRIEF DESCRIPTION OF THE DRAWINGS

FIG. 2 is a side elevational view thereof with portions broken away for purposes of illustration;

FIG. 3 is a perspective view, with portions broken away, of the ground clearing assembly;

FIG. 4 is an enlarged perspective view of the flail and fan unit;

FIG. 5 is an enlarged cross-sectional detail taken substantially on a plane passing along the line 5—5 in FIG. 3; and FIG. 6 is an enlarged traverse cross-sectional view taken substantially on a plane passing along the line 6—6 in FIG. 3.

DESCRIPTION OF PREFERRED EMBODIMENT

Figure 1:
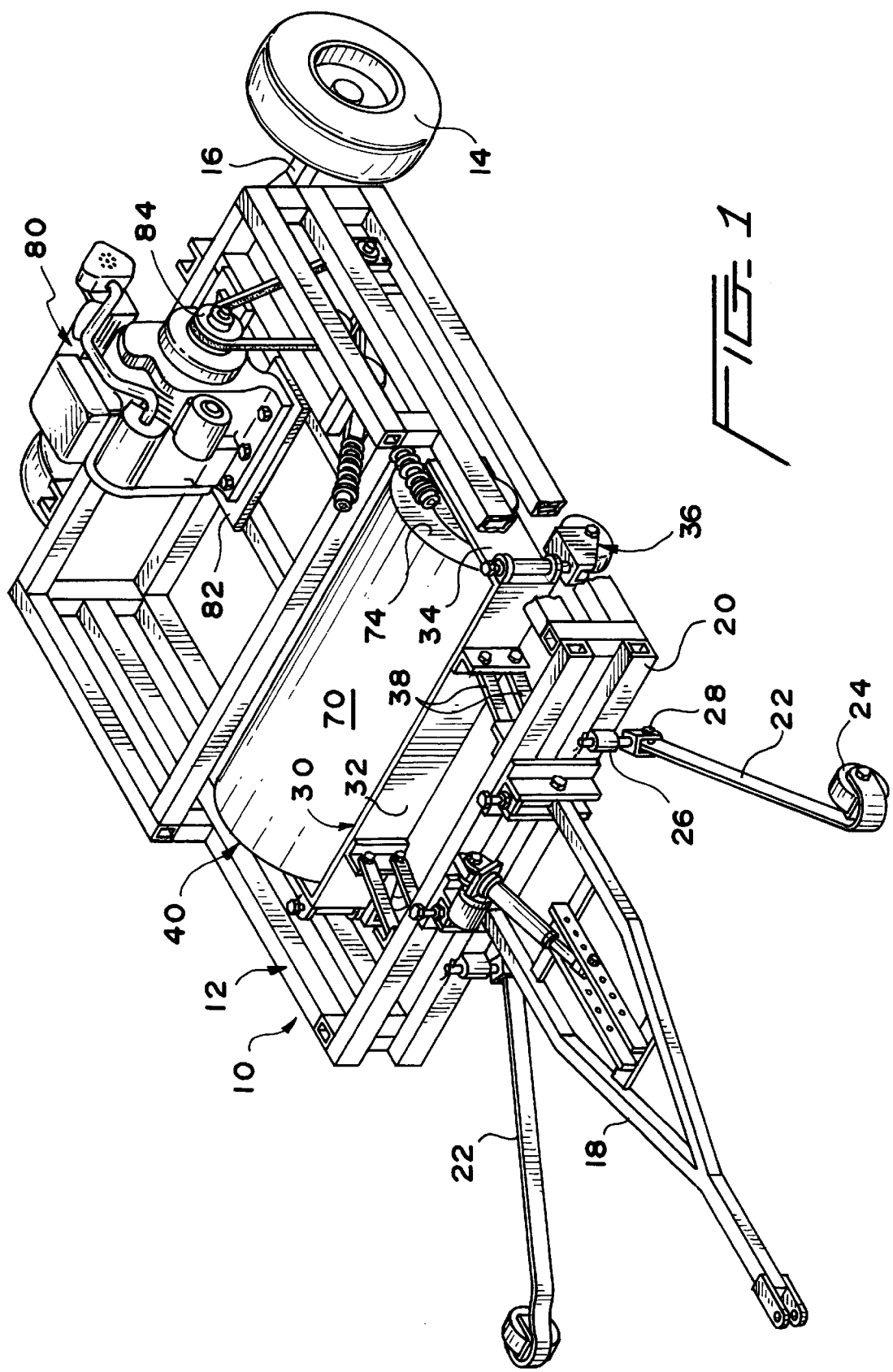
FIG. 1 is perspective view of the invention, including the ground clearing assembly and the mobile frame support.

Referring now more specifically to the drawings, the ground clearing apparatus of the invention includes a mobile frame 10 formed of welded bars 12, preferably hollow so as to minimize the weight of the apparatus. Support wheels 14, mounted on a transverse axis 16, support the rear of the frame. While such wheels may also be provided for the forward end of the frame, in the illustrated embodiment an appropriate tractor hitch 18 is utilized both for engagement with a towing vehicle and for the support of the forward end of the frame therefrom.

The forward or front end of the frame 10, from a lower cross rail 20 thereof, mounts a pair of laterally spaced and forwardly diverging gathering arms 22, each with an outer ground engaging support roller 24. These arms 22, which may be transversely arced to provide a concave inner face, are intended to inwardly gather the encountered debris for a central directing thereof toward the advancing frame 10. The rollers project only slightly below the forward ends of the arms so as to ensure a proper gathering of the materials without an actual scrapping engagement with the ground surface. It is contemplated that appropriate vertical and rotational supports 26 mount the inner ends of the arms 22 for adjustment both with regard to the height thereof and the lateral spread. As indicated at 28, the arms 22 are also mounted for vertical pivotal movement to provide a floating action to accommodate ground surface irregularities.

An inner floating frame 30 is positioned transversely across the mobile frame 20 between the side rails of the mobile frame and across substantially the entire interior width thereof in spaced relation rearward of the front end of the mobile frame 10. The floating frame 30 includes rigid front and side panels 32 and 34. Vertically adjustable ground engaging wheel assemblies 36 are mounted to the opposed side panels 34 and provide the principal support for the inner floating frame 30. The front panel 32 of the frame 30 is engaged in trailing relationship to the front of the mobile frame 10 by two sets of laterally spaced upper and lower rigid parallel links 38 pivotally mounted at the opposed ends thereof to the front of the mobile frame 10 and the front face of the front panel 32 of the floating frame 30. The floating frame 30, thus supported, will tend to float on the wheel assemblies 36 to accommodate to any changes in ground contour.

The ground clearing apparatus 40 itself is mounted within the floating frame 30 between the side panels 34 thereof and immediately rearward of the front panel 32. This apparatus includes a central driven shaft 42 which has a series of square mounting plates 44 coaxially fixed thereto and at spaced points along the driven shaft 42. For additional rigidity and stability, rectangular tubular sections 46 extend therebetween about the shaft 42 and are welded to the plates 44.

Four support rodsor shafts 48 extend through the four corner portions of the support plates 44 and are retained thereto by appropriate means. Each of the support rods 48 mounts a plurality of flails 50, preferably four, between each adjacent pair of support plates 44 for free pivotal movement on the corresponding support rod 48. The flails, as illustrated, are of an elongate rectangular configuration rotatably supported on the support rod 48 at the inner ends thereof for free swinging movement as the driven shaft 42 rotates. The flails are preferably of a rigid metal to provide a positive cutting and chopping action and oriented in planes parallel to the support plates 44. Metal washer-like heavy spacers 52 are provided on the support rods between adjacent flails 50 and between the flails and the adjoining support plates 44. These spacers 52 not only properly maintain the spacing between the freely pivoting flails 50, but also provide a fly wheel effect to supplement the driving force to the flail and fan unit.

The support plates 44 also mount four mounting plates 54 between adjacent support plates 44 and generally between rotationally adjacent pairs of the sets of flails 50. These mounting plates 54 are preferably welded to the support plates 44 intermediate the corners thereof with each mounting plate 54 in turn having a fan blade 56 mounted thereto. The fan blades 56 are of an appropriate slightly flexible material capable of providing a wiping action under a relatively high rotational speed. Such materials can include brush bristles, plastic, steel, elastomeric materials and the like. The blades are preferably replaceably secured by bolts 58 and the exact positioning thereof on the mounting plates 54 accommodated by slightly elongate bolt slots within the mounting plates 54. As will be appreciated from FIGS. 4 and 6 in particular, the mounting plates 54 and blades 56 will be slightly laterally offset from each other between each adjacent pair of support plates 44 to allow for an overlapping of adjacent edges of the blades 56 to provide complete coverage along the length of the unit, and to avoid interference between the flexure of the individual blades.

The flail and fan unit is enclosed by a cylindrical perforated drum 60 with a forwardly directed inlet or mouth 62 along the full length thereof at and peripherally above the lowermost extent of the drum so as to be substantially at ground level with the height thereof maintained by the wheel assemblies 36 on the floating frame 30. The drum mouth 62, being forwardly directed, opens in the direction of movement along the path of travel of the mobile frame 10 so as to inwardly scoop the ground debris. The drum 60, immediately rearward of the open mouth 62, incudes an arcuate plate 64 with a flat forwardly directed edge portion 66 which slightly diverges from the cylindrical configuration to assist in the inward scooping of the debris and allow for a slight extension of the fan blades 56 within the mouth area. The plate 64 can also act as a means for additionally preventing a scalping of the ground surface.

With regard to the relationship between the flails 50 and the fan blade 56, it is contemplated that the flails when fully extended in their normal operative position, extend to approximately one quarter inch of the smooth inner face or surface of the perforated drum 62 to allow for free action of the flails without contact with the drum, while at the same time obtaining full benefit of the flail action. The blades 56, because of the flexible nature thereof and the wiping action desired, will extend much closer to the drum surface, and in fact may contact this surface to ensure a full cleaning action.

The opposed ends of the drum 60 are closed by cylindrical end plates 68 which support the drum 60 and by which, by welding, bolting, or the like, the drum 68 is fixed to and between the side panels 34 of the floating frame 30.

The drum is partially enclosed by a hood 70 which arcs upwardly and rearwardly over the drum 60, from the upper edge of the open mouth 62 thereof to a point slightly beyond the uppermost extent of the drum 60, providing in effect an air chamber with a downwardly directed discharge 72. The hood 70, between the lower forward open end thereof and the rear discharge end 72 gradually increases in distance from the drum to accommodate material discharging through the perforated drum as it is pulverized and ultimately discharged to the rear of the drum.

The hood 70 includes end panels 74 which are coplanar with the end panels 68 of the perforated drum 60 and which are mounted to the drum for affixing of the hood relatively thereto.

In order to drive the flail and fan assembly, an appropriate power source, such as a gasoline engine 80, will be utilized. As illustrated, the motor 80 can mount to an elevated platform 82 constituting a portion of the mobile frame 10 rearward of the clearing assembly. Power transfer between the motor and the driven shaft 42 of the flail and fan unit, can be effected by one or more drive belts 82 engaged between the drive pulley 84 on the motor and the driven pulley 86 mounted on one end of the driven shaft 42 beyond one of the side panels 34 of the floating frame 30. As will be appreciated, the driven shaft 42, at the driven end, will extend, utilizing appropriate bearing supports, through the corresponding side panel 34. The opposite end of the driven shaft 42 will be appropriately bearing supported in the opposed side panel 34 of the floating frame 30.

Referring again to the drive system, appropriate spring loaded idler pulleys 88 will also be used as required to maintain belt tension as the apparatus moves across the ground and accommodates itself to varying ground conditions.

Turning now to the operation of the apparatus, as the mobile frame, utilizing an appropriate towing vehicle, is moved along a path of travel, the flail and blade assembly, positioned transversely across the mobile frame and hence across the path of travel, is rotatably driven with the flails and blades sweeping forwardly and upwardly across the open mouth 62 of the perforated drum 60. It is contemplated that the driven shaft 42, mounting the flails and the blades, rotate at approximately 2800 rpm. Operating in this manner, it is found that a positive air flow, produced by the sweeping blades 56, is created across the mouth of the drum and into the interior thereof which, in conjunction with the forward movement of the apparatus, effectively picks up and inwardly moves the ground debris, including the plugs, balled thatch and the like. Once within the drum, the debris is subjected to the freely swinging flails which quickly pulverize the material as it is outwardly flung against the interior of the drum. This action, in conjunction with the wiping action of the blades, ensures a positive pulverization with the material being effectively discharged through the perforations or openings in the drum as the material sufficiently reduces in size, toward the upper extremity of the drum, to pass through the openings. The openings are of course sized so as to in effect set the size of the pulverent discharge. The supplemental pulverizing action of the blades is particularly significant in completing the pulverizing action of the flails, with the wiping action and the air flow created by the blades ensuring a proper discharge through the openings regardless of the moisture content of the material. In other words, were just a flailing action provided, there would be a tendency for the perforations to rapidly clog. This would be particularly be the case should there be a substantial amount of ground moisture.

The overlying hood, forming in effect an arcuate wind tunnel, guides the discharging pulverent rearwardly. The rapid rotational movement of the blades in particular, in addition to providing for a positive air flow within the drum, will also provide a complementary air flow within the chamber of the hood. This, in addition to ensuring an appropriate rearward discharge of any material passing through the drum openings, will also enhance the self-cleaning nature of the assembly, and particularly the drum apertures.

The apparatus thus described, is considered to be a particularly significant addition to golf course grooming equipment in that not only is substantial manual labor eliminated, but the actual down time of the green or greens, and possibly the entire golf course, is substantially reduced, and the environment, including the greens and surrounding areas, better prepared.

While a specific embodiment of the invention has been illustrated, the invention is not to be taken as limited to all of the details thereof as modifications and variations thereof may be made without departing from the spirit or scope of the invention as presented in the claims hereinafter.

What is claimed is:

1. Ground clearing apparatus comprising a mobile support structure movable along a path of travel on a ground surface, an elongate, hollow perforated drum supported by said support structure transversely of said path of travel, a rotatable shaft extending coaxially through said drum, means for rotatably driving said shaft, a plurality of flails having inner and outer ends and extending laterally of said shaft, means for mounting said flails at the inner ends thereof to said shaft for rotation therewith and for free swinging rotation of said flails about axes parallel to said shaft, a plurality of air-flow generating blades extending laterally of said shaft and having free outer edges generally parallel to said shaft, means for mounting said blades to said shaft for rotation therewith, said drum having a debris receiving mouth extending axially therealong and opening forwardly along the path of travel substantially at the level of the ground surface, said blades, upon rotation of said shaft, moving across said mouth and enhancing an inward flow of debris into said drum for pulverization of the debris as said apparatus moves along said path of travel.

2. The apparatus of claim 1 wherein said drum has a smooth inner surface, said flail outer ends extending to a position adjacent and immediately inward of said drum inner surface, said blade outer edges being so positioned relative to said drum inner surface as to force a discharge of pulverized debris therethrough.

3. The apparatus of claim 2 including an arcuate hood coextensive with the length of said drum in outwardly spaced relation thereto to define an arcuate air chamber extending from an open end substantially adjacent and slightly above said drum mouth to a second discharge end rearward of said drum relative to said path of travel, said air chamber enhancing the rearward discharge of pulverized debris.

4. The apparatus of claim 3 wherein said means for mounting said flails comprises a plurality of support plates fixed to said rotatable shaft at spaced points therealong and extending radially outward therefrom about said shaft, and a plurality of elongate support rods extending through said support plates parallel to said shaft in outwardly spaced relation thereto, said rods extending for substantially the full length of said drum and being at approximately equally spaced points about said shaft, said flails being rotatably received on said rods between said support plates.

5. The apparatus of claim 4 wherein several flails are mounted on each rod between each pair of adjacent support plates, said flails being spaced from each other and from adjacent ones of said support plates by weights mounted on said rods wherein a rotation enhancing force is achieved as said shaft rotates.

6. The apparatus of claim 5 wherein said means for mounting said blades comprises mounting plates fixed to and extending between adjacent ones of said support plates, each of said blades overlapping one of said mounting plates and extending outward therefrom toward said surrounding perforating drum, and releasable fastener means affixing each blade to the corresponding mounting plate.

7. The apparatus of claim 6 wherein the blades between one pair of adjacent support plates are laterally offset from the blades on a second pair of adjacent support plates wherein interference between longitudinally adjacent blades along the length of said rotatable shaft is avoided.

8. The apparatus of claim 7 including a floating frame, rigid pivotally mounted links engaged between said support structure and said floating frame for vertical movement of said frame relative to said support structure, and ground engaging wheels depending from said floating frame wherein as said wheels follow the natural ground contour, the floating frame will vertically adjust relative to said support structure, said perforated drum and rotatable shaft mounting to said floating frame for movement therewith.

9. The apparatus of claim 8 wherein said support structure includes a pair of gathering arms mounting thereto and extending forwardly therefrom along said path of travel, said gathering arms being laterally spaced and diverging forwardly from said support structure wherein encountered debris is laterally and rearwardly directed toward the advancing drum.

10. The apparatus of claim 3 wherein said means for mounting said blades comprises a plurality of support plates fixed to said rotatable shaft at spaced points therealong and extending radially outward therefrom, mounting plates fixed to and extending between adjacent ones of said support plates, each of said blades overlapping one of said mounting plates and extending outward therefrom toward said surrounding perforating drum, and releasable fastener means affixing each blade to the corresponding mounting plate.

11. The apparatus of claim 10 wherein the blades between one pair of adjacent support plates are laterally offset from the blades on a second pair of adjacent support plates wherein interference between longitudinally adjacent blades along the length of said rotatable shaft is avoided, said blades including edge portions thereof extending longitudinally over the adjacent support plates wherein continuous blade coverage is provided along the length of said drum.

12. The apparatus of claim 1 including a floating frame, rigid pivotally mounted links engaged between said support structure and said floating frame for vertical movement of said frame relative to said support structure, and ground engaging wheels depending from said floating frame wherein as said wheels follow the natural ground contour, the floating frame will vertically adjust relative to said support structure, said perforated drum and rotatable shaft mounting to said floating frame for movement therewith.

13. The apparatus of claim 12 wherein said support structure includes a pair of gathering arms mounting thereto and extending forwardly therefrom along said path of travel, said gathering arms being laterally spaced and diverging forwardly from said support structure wherein encountered debris is laterally and rearwardly directed toward the advancing drum.

14. Ground clearing apparatus comprising a mobile support structure moveable along a path of travel on a ground surface, an elongate hollow perforated drum supported by said support structure transversely of said path of travel, said drum having a debris-receiving mouth extending axially therealong and opening forwardly along the path of travel substantially at the level of the ground surface, first means within said drum for receiving and pulverizing debris received through said drum mouth, and second means within said drum for forcing pulverized debris outward through perforations in said perforated drum remote from said mouth and rearwardly of said drum relative to said path of travel.

15. The apparatus of claim 14 including a single driven shaft mounting said first means and said second means in alternating positions peripherally thereabout.

16. The apparatus of claim 15 wherein said second means comprises a series of flat blades with outer edges extending lengthwise of said drum and positioned in close proximity thereto, said blades, upon rotation of said shaft, generating an internal flow of air within said drum inwardly drawing debris through said mouth and about the interior of said drum.

17. The apparatus of claim 16 including an arcuate hood overlying said drum in outwardly spaced relation thereto and defining an arcuate air chamber extending from an inlet end adjacent said mouth of said drum to a discharge end rearward of said drum relative to said path of travel, said blades effecting a rearward flow of air within said air chamber and enhancing rearward discharge of the pulverized debris.

18. The apparatus of claim 17 wherein said first means for pulverizing said debris comprises a plurality of freely pivoting flails mounted to said shaft and alternating with said blades peripherally about said shaft.

19. The apparatus of claim 18 wherein said blades and said flails are provided in separate adjacent sets along said shaft for the length of said drum.

* * * * *